Jan. 31, 1961 R. K. THELEN 2,969,775
VALVE
Filed Sept. 23, 1957 2 Sheets-Sheet 1
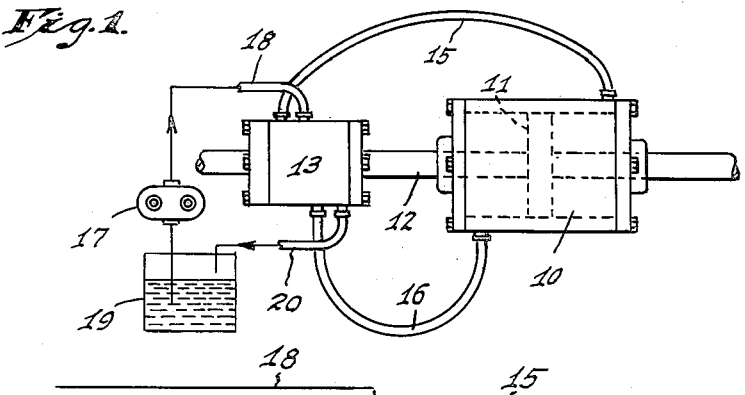
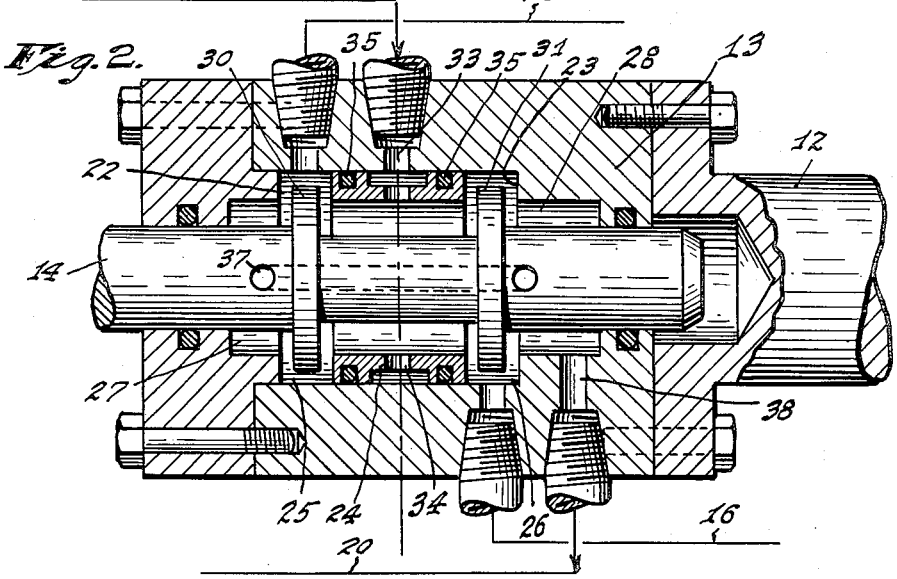
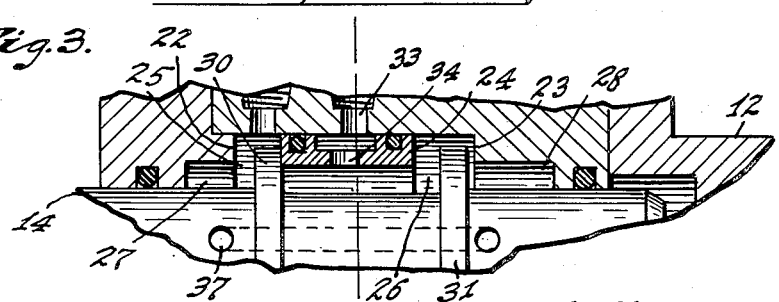
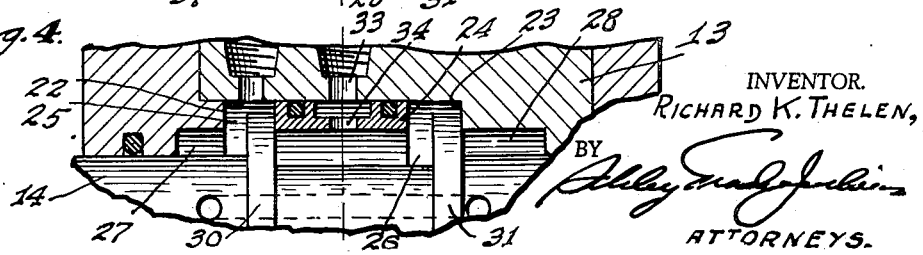
INVENTOR.
RICHARD K. THELEN,
BY
ATTORNEYS.

Jan. 31, 1961   R. K. THELEN   2,969,775
VALVE
Filed Sept. 23, 1957   2 Sheets-Sheet 2
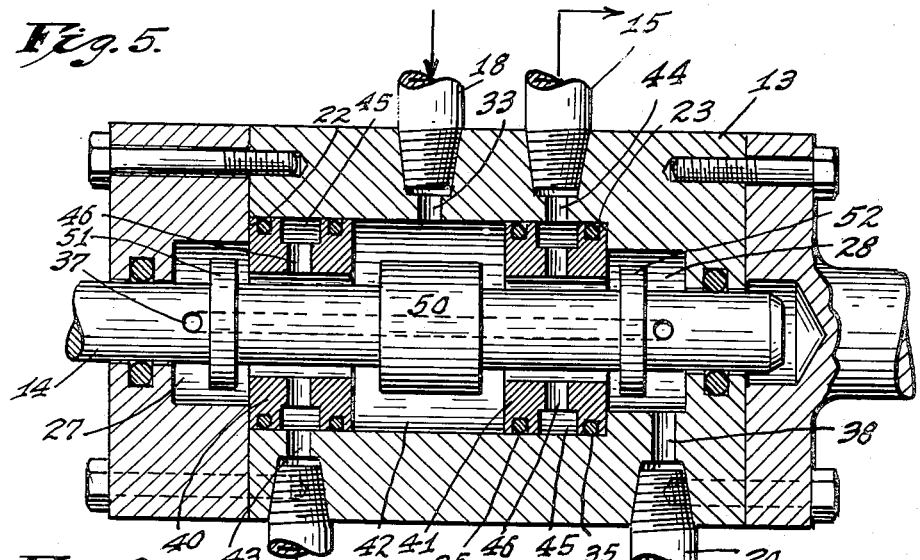
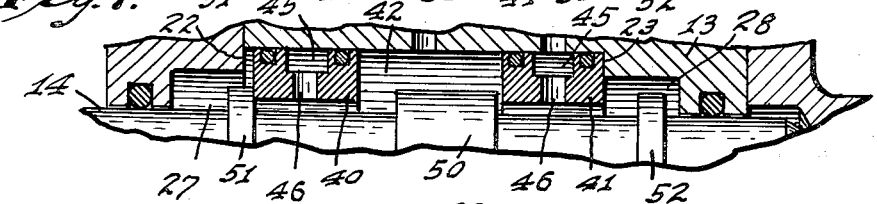
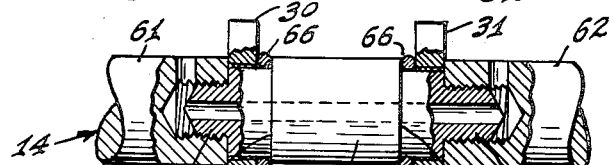
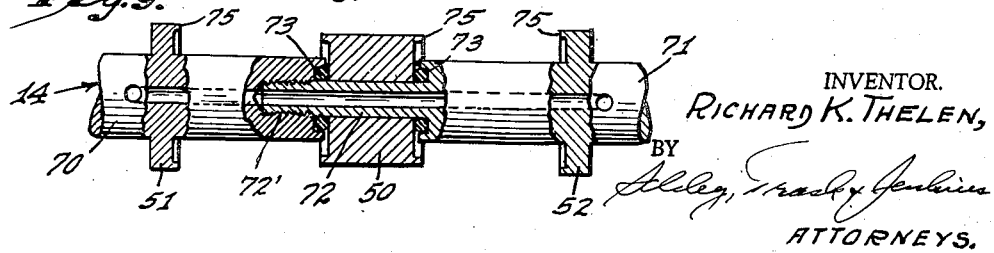
INVENTOR.
RICHARD K. THELEN,
BY
ATTORNEYS.

United States Patent Office 2,969,775
Patented Jan. 31, 1961

2,969,775
VALVE

Richard K. Thelen, Lafayette, Ind., assignor to Ross Gear and Tool Company, Inc., Lafayette, Ind., a corporation of Indiana Filed Sept. 23, 1957, Ser. No. 685,705

14 Claims. (Cl. 121—46.5)

This invention relates to a control valve for a hydraulic servo-mechanism and particularly to a control valve of the open-center type embodying a pair of telescopically associated valving elements. In such mechanisms, when the valve is in its neutral position, the pressure fluid circulates freely through it, but upon any displacement of the valve from the neutral position fluid is directed to the servo-motor to cause operation thereof.

As usually made, open-center valves of the type referred to exercise their control in response to displacements of relatively small magnitude, usually of a few thousandths of an inch, and depend for their control of fluid flow upon sealing engagement between sliding surfaces. As a result, great accuracy has been necessary in manufacture of the valve; and, because of the manner in which sealing is effected, limitations exist in the minimum length of the valve.

It is an object of my invention to produce, especially for use in a servo-system, an open-center type valve which will accomplish the sensitivity of control characteristic of open-center valves, but which does not require a high degree of accuracy in its manufacture. A further object of the invention is to produce an open-center valve which, in operation, will inherently be biased toward its neutral position with a force proportional to that exerted by the hydraulic motor it controls. Still another object is to reduce the cost and over-all length of valves of the type indicated.

A valve embodying my invention is characterized by the fact that control of pressure-fluid flow is exercised in part by surfaces which come into abutting, sealing engagement with each other in operation of the valve. The two surfaces of each pair of abutting surfaces are provided respectively on one of the relatively movable valve members and on a ring or annular element which has sealing engagement with one of the valve members and is freely slidable axially relative to both valve members within the limits provided by sealing surfaces on one or both valve members. Fluid passages within the valve include portions extending radially through each ring intermediate the ends thereof. Each orifice defined by an end of a ring and an opposed surface of a valve member varies in area upon relative movement of the ring and the valve member, and the variation in areas of the several orifices create fluid-pressure differentials which act on the valve members and urge them to neutral position when they are displaced therefrom.

Further objects and features of the invention will become apparent from the following more detailed description and from the accompanying drawings, in which:

Fig. 1 is a view, somewhat schematic in character, illustrating a servo-system;

Fig. 2 is an axial section through the valve of the servo-system shown in Fig. 1, the valve being illustrated in its neutral position;

Fig. 3 is a fragmental sectional view similar to Fig. 2 but illustrating the valve displaced to an extent from its neutral position;

Fig. 4 is a view similar to Fig. 3 illustrating a valve displaced to a greater extent;

Fig. 5 is a view similar to Fig. 2 illustrating a modified form of valve, the valve being shown in its neutral position;

Fig. 6 is a fragmental section similar to Fig. 5 illustrating the valve there shown as displaced to an extent from its neutral position;

Fig. 7 is a view similar to Fig. 6 showing the valve displaced to a greater extent;

Fig. 8 is an axial section through a modified valve member of the type shown in Figs. 1 to 4; and Fig. 9 is an axial section through a modified valve member of the type shown in Figs. 5 to 7.

The servo-system shown in Fig. 1 includes a servo-motor shown as comprising a stationary cylinder 10 and a piston 11 axially slidable in such cylinder, and rigid with a piston rod 12. Operation of the servo-motor is controlled by a valve having a housing 13 secured to the piston rod 12 and axially reciprocable control member 14. Opposite ends of the motor cylinder 10 are connected to the valve housing 13 through flexible conduits 15 and 16. Pressure fluid for operating the motor under the control of the valve is delivered by a pump 17 to the valve housing 13 through a conduit 18, such fluid being drawn from a sump 19 to which fluid is returned from the valve housing through a conduit 20.

The valve housing 13 has a bore provided with spaced, opposed shoulders 22 and 23 between which there is slidably received in sealing engagement with the bore-wall a ring member 24 dividing the space between the shoulders 22 and 23 into two chambers 25 and 26 communicating respectively with the conduits 15 and 16. Beyond the shoulders 22 and 23, the bore of the housing continues outwardly at reduced diameter to provide end chambers 27 and 28.

The valve-control member 14 extends into and through the bore of the housing 13 and is provided with a pair of spaced annular flanges or lands 30 and 31 located respectively within the chambers 25 and 26. The lands 30 and 31 project radially outward into overlapping relation with the shoulders 22 and 23 and with the end faces of the ring 24.

The valve housing 13 is provided within the limits of the ring 24 with an inlet port 33 connected to the conduit 18 to receive pressure fluid from the pump 17. The outer surface of the ring 24 has a centrally located annular groove which communicates directly with the inlet port 33 and, through ports 34 in the ring, with the interior thereof. Sealing means, such as O-ring seals 35, are provided in the ring 24 to prevent axial leakage of fluid over the outer surface of the ring.

The end chambers 27 and 28 of the housing-bore communicate with each other, conveniently through a passage 37 formed in the valve-member 14, and with an exhaust port 38 connected to the fluid return conduit 20.

In the neutral position of the valve shown in Fig. 2, the ring 24 is substantially centered between the two lands 30 and 31, and such lands are in turn substantially centered with respect to the shoulders 22 and 23. In this condition, fluid supplied through the conduit 18 passes through the ports 33 and 34 into the interior of the ring 24, where it divides and flows in opposite axial directions into the end chambers 27 and 28. Fluid thus delivered to the end chamber 28 passes through the port 38 and conduit 20 to the sump 19 for recirculation, while fluid delivered to the chamber 27 flows through the passage 37 to chamber 28 and returns to the sump through port 38 and conduit 20. With the ring 24 centered between the lands 30 and 31 and with the lands centered in respect to the shoulders 22 and 23, the division of the fluid between the two streams will be substantially equal, and substantially equal pressures will exist in the chambers 25 and 26. As those chambers are connected respectively through the conduits 15 and 16 with opposite ends of the servomotor cyclinder 10, the pressures on opposite faces of the piston 11 will be equal and no movement of the piston will result.

If the valve member 14 is displaced, say to the right, for a short distance relative to the housing 13, the condition illustrated in Fig. 3 will eventually result. Any such displacement of the valve member will reduce the areas of the orifices between the land 30 and ring 24 and between the land 31 and shoulder 23 and, at the same time, will increase the areas of the orifices between the land 30 and shoulder 22 and between the ring 24 and the land 31. As a result of these changes in orifices-areas, the inlet pressure will increase, and the increased pressure will be transmitted to chamber 26 through the enlarged orifice at the left of land 31. However, because of constriction of the orifice at the right of land 27, the pressure in chamber 25 will remain essentially unchanged. As the pressures in chambers 25 and 26 act oppositely on the end faces of the ring 24, the larger pressure in the chamber 26 will urge the ring 24 toward the land 30; and when the net force on the ring becomes gerat enough to overcome friction between it and the inner surface of the housing, the ring will move into contact with the land 30 to produce the condition illustrated in Fig. 3. In this condition, all pressure fluid delivered through the port 33 and entering the interior of the ring 24 will flow into the chamber 26. If the rightward displacement of the valve member is insufficient to bring the land 31 into engagement with the shoulder 23, fluid so delivered to the chamber 26 can pass through the orifice between the land and shoulder into the end chamber 28 and return to the sump 19. However, the reduction in the area of the orifice between the land 31 and the shoulder 23 produces an increase in pressure in the chamber 26, and such pressure increase will be transmitted through the conduit 16 to the left-hand end of the cylinder 10. As engagement of the ring 24 with the land 30 terminated communication between the pressure port 33 and the chamber 25, the right-hand end of the cylinder will not be subjected to pressure. If the differential pressure thus created on the piston 11 is sufficient to overcome the load imposed upon it, such piston will move to the right to follow the initial displacement of the valve member 14. However, if the initial displacement of the valve member 14 does not create in opposite ends of the cylinder 10 a sufficient pressure-differential to force the piston 11 to the right against its load, continued rightward movement of the valve member will further reduce the area of the orifice between the land 31 and shoulder 23 and further increase pressure in the chamber 26 and in the left-hand end of the cylinder, thus further increasing the force acting on the piston. If rightward movement of the piston is continued until the land 31 engages the shoulder 23 (Fig. 4), escape of fluid from the chamber 26 to the end chamber 28 will be prevented, and the left-hand end of the cylinder 10 will be subjected to full pump pressure.

Any fluid displaced from the right-hand end of the cylinder 10 by rightward movement of the piston 11 will be returned to the sump 19 via the conduit 15, chamber 25, passage 37, port 38 and conduit 20.

When the piston 11 moves to the right under the influence of excess pressure in the left-hand end of the cylinder 10, it carried the valve housing 13 with it and tends to restore the neutral condition of the valve. However, if movement of the valve member 14 to the right continues, one or the other of the conditions illustrated in Figs. 3 and 4 will continue, and the piston 11 will continue to move to the right.

When rightward movement of the valve member 14 terminates, the piston 11 will continue to move to the right carrying with it the housing 13 and opening the orifice between the land 31 and shoulder 23. The enlargement of such orifice decreases pressure in the chamber 26 and in the left-hand end of the cylinder, thus decreasing the net rightward force acting on the piston. When the net force acting on the piston becomes equal to the load, movement of the piston ceases.

It may be noted that the centered position of the ring 24 between the lands 30 and 31 seldom exists for any length of time in actual operation. With the ring in engagement with the land 30, as in Fig. 3, pressure in the chamber 26 can never drop below that in the chamber 25, and as the former pressure acts on the entire area of the end face of the ring while the latter acts only on so much of such area as lies outwardly beyond the land 30, the existence of even equal pressures in the chambers 25 and 26 will result in a net leftward force tending to maintain the ring in contact with the land 30. However, by a proper relation between the diameter of the lands and the inner and outer diameters of the ring, the net force acting on the ring when pressures in the chambers 25 and 26 are substantially equal can be made less than the frictional drag between the ring and the inner wall of the housing. Hence, if the valve member 14 is moved to the left from the position shown in Fig. 3, the ring 24 will move with it until the enlargement of the orifice between the land 31 and the shoulder 23 reduces pressure in the chamber 26 to such a point that the net hydraulic force acting leftwardly on the ring is insufficient to overcome friction between the ring and the inner surface of the housing. Thereafter, if leftward movement of the valve member 14 continues, the ring will remain stationary in the housing until changes in orifice areas cause pressure in the chamber 25 to exceed that in chamber 26 by an amount sufficient to overcome friction and force the ring into engagement with the land 31.

When a condition such as that shown in Fig. 3 exists, the net leftward force exerted on the ring 24 by pressure in the chamber 26 is transmitted to the valve member 14 through the land 30 and hence urges the valve member to the left. As the pressure in the chamber 26 is the same as that acting in the cylinder 10 to urge the piston 11 to the right, the net force applied to the ring 24 by virtue of the difference in the pressures acting on its opposite faces will be proportionate to the effort exerted on the piston 11; and as the later effort is proportionate to the load, the valve member 14 will always be urged toward neutral position by a force substantially proportionate to that required to overcome the load on the piston rod 12. The magnitude of the valve-centering effort for any given load will depend upon the effective area over which pressures act on the ring 24, such area being the annular area defined by the circumferences of the chamber 26 and the land 31. To maintain rightward movement of the piston 11, the operator must exert on the valve member 14 a force sufficient to overcome the differential pressure acting on the ring 24. Thus, the operator is always conscious of the effort being exerted by the servo-motor, a condition which is highly desirable in such servo-systems as hydraulic-steering mechanisms for vehicles.

As will be obvious, leftward movement of the valve member 14 relative to the housing 13 will produce effects corresponding, but opposite in direction, to those produced by rightward displacement of the valve member from its neutral position. Thus, leftward movement of the valve member from the neutral position shown in Fig. 2 will increase pressure in the chamber 25, decrease pressure in the chamber 26, and cause the ring 24 to be forced into contact with the valve land 31, thus directing all pressure fluid into the chamber 25 from which it can escape either through the passage 37, and chamber 28, port 38, and conduit 20 to the sump or through conduit 15 to the right-hand end of the cylinder 10 to urge the piston 11 to the left. The differential pressure which urges the ring 24 to the right into contact with the valve land 31 is transmitted to the valve member 14 and urges it to the right, or toward neutral position, with a force substantially proportionate to the load on the piston.

In the valve shown in Fig. 5, the housing 13 has a bore provided as before with axially spaced, opposed shoulders 22 and 23 defining end chambers 27 and 28 of reduced diameter. Located within the housing and respectively adjacent the shoulders 22 and 23 are two rings 40 and 41 defining between them a central chamber 42 adapted to communicate with the fluid-supply pipe 18 through the port 33. Spaced inwardly from the shoulder 22, the housing 13 has a port 43 adapted for connection to the conduit 16 which extends to the left-hand end of the cylinder 10. A similar port 44 spaced inwardly from the shoulder 23 is adapted for connection to the right-hand end of the cylinder 10 through the conduit 15. The ring 40 overlaps the port 43 and is provided in its outer surface with an annular groove 45 communicating with such port, such groove communicating also with the interior of the ring through radial ports 46. A similar groove and ports in the ring 41 provide for communication between its interior and the port 44.

In the valve of Fig. 5, the valve member 14 is provided with a central land 50 and with end lands 51 and 52. The central land 50 and end land 51 receive between them the ring 40 and overlap the end faces of such ring radially. The other ring 41 is received between the central land 50 and the end land 52, and its end faces are overlapped radially by such lands. The distance between the central land and each of the end lands is somewhat greater than the axial extent of each ring so that orifices are provided at the opposite end faces of the rings. The shoulders 22 and 23 are so spaced that when the rings 40 and 41 are in contact with them and the valve is centered axially with the land 50 midway between the two rings the orifices at the inner faces of the rings will be of greater axial extent than those at the outer faces of the rings.

The valve shown in Fig. 5 operates in the following manner: When the valve member is centered as shown, liquid entering the port 33 divides in the chamber 42 into two streams, one flowing to the left through the ring 40 and into the end chamber 27 and thence through the passage 37 in the valve member 14, the opposite end chamber 28, port 38, and return line 20 to the sump 19. The other stream flows to the right through the ring 41 and into the chamber 28 and through the port 38 and conduit 20 to the sump. Because of pressure drops at the flow-controlling orifices, the pressure in the chamber 42 will exceed that in the end chamber 27 and 28, and the rings 40 and 41 will be urged outwardly into contact respectively with the shoulders 22 and 23.

Displacement of the valve member 14 from the neutral or central position illustrated in Fig. 5 will alter the areas of the various flow-controlling orifices. Specifically, if the valve member is displaced to the right, the orifices at the inner end of the ring 40 and at the outer end of the ring 41 will be enlarged, while the orifices at the outer end of the ring 40 and at the inner end of the ring 41 will be contracted. These changes in effective orifice areas increase fluid pressure within the ring 40 and decrease pressure within the ring 41. Transmitted to opposite ends of the cylinder 10 through the conduits 16 and 15, those thus-altered pressures tend to move the piston 11 to the right. Movement of the valve member 14 to the right relative to the housing 13 will continue until the difference in pressures at opposite ends of the cylinder 10 becomes sufficient to overcome the load on the piston rod 12, whereupon the piston rod will move to the right to follow the valve member 14, as set forth above in the description of the device shown in Figs. 1 to 4.

If rightward movement of the valve member 14 relative to the housing 13 continues far enough, the valve land 51 will engage the ring 40, and thereafter such ring will move to the right with the valve member. Since, as previously noted, the orifice at the inner ends of the ring 41 originally had a greater axial extent than the orifice at the outer end of the ring 40, the land 51 will engage the ring 40 before the land 50 engages the ring 41. Thus, although engagement of the land 51 with the ring 40 will prevent escape of fluid into the end chamber 27, the orifice at the inner end of the ring 41 still remains open, with the result that at least some of the fluid delivered to the chamber 42 can flow through the ring 41 and into the sump 19 by way of the end chamber 28, port 38, and conduit 20. If the difference in pressures existing within the rings 40 and 41 and in opposite ends of the cylinders 10 is not great enough to overcome the load on the piston rod 12 when the land 51 engages the ring 40, continued rightward movement of the valve member will further reduce the area of the orifice at the inner end of the ring 41 to produce a further increase in the pressure in chamber 42 and a further decrease in the pressure within the ring 41. As the increased pressure in chamber 42 is transmitted through the interior of the ring, port 43 and conduit 16 to the left-hand end of the cylinder while the decreased pressure is transmitted to the right-hand end of the cylinder, the net rightward force on the piston 11 will increase. Should rightward movement of the valve member 14 continue until the land 50 engages the ring 41, escape of fluid through that ring will be prevented, pressure in the right-hand end of the cylinder will drop substantially to zero, and the left-hand end of the cylinder will be subjected to full pump pressure.

Any fluid displaced from the right-hand end of the cylinder 10 is rightward movement of the piston will return to the sump 19 through the conduit 15, the interior of ring 41, end chamber 28, port 38, and conduit 20.

When a condition such as that shown in Fig. 7 exists the valve member 14 is urged toward centered position by a force applied to it through the ring 40. The inner end of such ring is subjected to the pressure within the chamber 42; but, as the end chamber 27 is sealed off from the chamber 42 by engagement between the ring and the land 51, the outer end of the ring is not subjected to any substantial pressure. As a result, a net leftward force acts on the ring 40 and is transmitted to the valve member through the land 51. Such force varies with the pressure in chamber 42; and as the net force acting on the piston 11 also varies in the same sense with pressure in chamber 42, the effort which must be applied to the valve member 14 to maintain the condition illustrated in Fig. 6 will vary with the load. The magnitude of that effort will depend on that of the annular area defined by the circumferences of the chamber 42 and land 50.

The specific hydraulic valve-centering effect above described exists only after the valve member 14 has been displaced from its center position by a distance great enough to move one or the other of the rings 40 and 41 away from its associated shoulder 22 or 23. However, by making the outer lands 51 and 52 of greater diameter than the land 50, a noticeable valve-centering effect is created before one or the other of the rings 40 and 41 is engaged by its adjacent outer land. The magnitude of this initial valve-centering effort will be proportional to the pressure and to the magnitude of an annular area defined by the circumference of the outer lands 51 and the circumference of the inner land 50.

It will be apparent from Fig. 4 that in the valves of Figs. 1 through 4 complete sealing of either outer land against its adjacent shoulder 22 or 23 will depend upon exact parallelism between the shoulders and the opposite face of the land. To provide an adequate seal without the necessity for such exact parallelism, the valve member 14 may be constructed as shown in Fig. 8. As there illustrated, the valve member or spool comprises a central body 60 rigidly secured between two aligned stems 61 and 62 adapted for sliding reception in the valve housing 13. Conveniently, the valve body 60 has screw-threaded extensions 63 received in screw-threaded openings in the opposed ends of the stems 61 and 62. Between its middle and the extensions 63, the body 60 is reduced in diameter to provide shoulders 64 and 65, and on the portions of such reduced diameter the lands 30 and 31 are mounted. An elastically compressible seal 66 is disposed between each of the lands 30 and 31 and its adjacent shoulder 64 or 65, such seals resiliently urging the lands outward into contact with the ends of the stems 61 and 62. The fit of the lands 30 and 31 on the reduced-diameter portions of the body 60 is loose enough to permit a slight rocking movement of the lands which, coupled with the elasticity of the seals 66, permits each land to engage its adjacent shoulder 22 or 23 for the entire circumference.

In the construction of Fig. 5, complete sealing also involves exact parallelism between the end faces of the land 50, the shoulders 22 and 23, and the end faces of the rings 40 and 41. To eliminate the necessity for such exact parallelism, I may employ the construction shown in Fig. 9. As there illustrated, the valve body 14 comprises a pair of aligned stem members 70 and 71 which are rigidly interconnected and adapted for sliding movement in the valve housing 13. As shown the member 71 has an extension 72 of reduced diameter which has a screw-threaded connection 72' with the member 70. The land 50 is mounted on the extension 72 and located axially between two elastically compressible seals 73 engaging opposed faces on the members 70 and 71 respectively. As in the construction of Fig. 8, the fit of the land 50 on the extension 72 is loose enough to permit some rocking of the land so that it can engage either of the rings 40 and 41 for the entire circumference. The fit of the rings 40 and 41 within the chamber 42 is loose enough to permit each of them to rock as necessary to provide circumferentially continuous engagement with the adjacent shoulders 22 or 23.

In Fig. 9, I have shown the lands 51 and 52 as of larger diameter than the land 50 in order to provide the initial valve-centering effort described above in connection with Figs. 5, 6, and 7. In addition, I have shown both those lands and the land 50 as provided at their peripheries with lips 75 adapted to engage the respectively adjacent end faces of the rings 40 and 41. I have found that such lips augment the initial valve-centering effort which exists before one or the other of the lands 50 and 52 engages its adjacent ring.

The various valves shown and described have the advantage of permitting relatively wide manufacturing tolerances, as exact concentricity of the valve member and housing-bore and exact axial location of the flow-regulating surfaces is not essential.

I claim as my invention:

1. A flow-controlling valve, comprising a housing having a bore and provided with three axially spaced ports communicating with said bore, the intermediate one of said ports serving as an inlet port adapted for connection to a source of fluid and the other ports being motor ports adapted for connection to a reversible hydraulic motor, a valve member extending and axially slidable in said bore, and means operated by axial movement of said valve member for controlling the division between the motor ports of fluid supplied to said inlet port, said means comprising a ring in sealing engagement with the wall of said bore and overlying one of said ports, said ring having a radial passage providing communication between the interior of the ring and the port overlain thereby, said valve member having a land radially overlapping one end face of said ring and movable with the valve member toward and away from engagement with such end face, said housing being provided with an outlet port and said valve having passage means for conveying to said outlet port fluid which enters the inlet port and does not flow through one or the other of said motor ports, said ring when not engaged by said land being freely slidable in said bore under the influence of differential fluid pressures acting respectively on its end faces.

2. A valve as set forth in claim 1 with the addition that said ring overlies the inlet port, said valve member having two of said lands located respectively at opposite ends of said ring.

3. A valve as set forth in claim 1 with the addition that there are two of said rings respectively overlying said motor ports, said land being located between said rings and alternatively engageable with either in the movement of the valve member.

4. A flow-controlling valve, comprising a housing having a bore provided with axially spaced, opposed shoulders defining end portions of reduced diameter, said housing being provided between said shoulders with three axially spaced ports communicating with said bore, the intermediate one of said ports being an inlet port for connection to a source of fluid and the other ports being motor ports for connection to a reversible hydraulic motor, a valve member extending and axially slidable in said bore, said valve member having a pair of axially spaced lands located between and radially overlapping said shoulders, the axial distance over said lands being less than the distance between said shoulders to permit limited axial movement of the valve member, a ring slidable in sealing engagement with said bore and disposed between said lands in overlying relation to said inlet port, said ring having an opening extending radially through it to provide communication between the interior of the ring and the inlet port, said ring being overlapped radially by said lands and having a length less than the distance between said lands to permit limited axial movement of the ring relative to the valve member, said housing having an outlet port, and passage means connecting said end chambers with said outlet port, said ring being freely slidable between said lands under the influence of differential fluid pressures acting respectively on its end faces.

5. A valve as set forth in claim 4 with the addition that said valve member is provided with a pair of opposed shoulders, said lands being separate elements carried by the valve member between said shoulders and having limited freedom of rocking movement on the valve member, and resilient means urging said lands into contact with the respective shoulders on the valve member.

6. A flow-controlling valve, comprising a housing having a bore provided with axially spaced, opposed shoulders defining end portions of reduced diameter, said housing being provided between said shoulders with three axially spaced ports communicating with said bore, the intermediate one of said ports being an inlet port for connection to a source of fluid and the other ports being motor ports for connection to a reversible hydraulic motor, a valve member extending and axially slidable in said bore, said valve member having three axially spaced lands the outer ones of which are of smaller diameter than said end chambers and receivable therein, a pair of rings slidable in sealing engagement with said bore between said shoulders and being located between said middle land and the respective outer lands, each of said rings overlying one of said motor ports and having a radial opening providing communication between its interior and the overlain motor port, each of said rings being overlapped radially by the two lands between which it is located and having a length less than the distance between such lands to permit limited axial movement of each ring relative to the valve member, the sum of the axial lengths of the middle land and the two rings being less than the distance between said shoulders to permit limited movement of the valve member relative to the housing, said housing having an outlet port, and passage means connecting said end chambers with said outlet port.

7. A valve as set forth in claim 6 with the addition that said outer lands have a diameter greater than that of the inner land.

8. A valve as set forth in claim 6 with the addition that said lands are provided with annular lips for engagement with the end faces of said rings, the diameter of the lips on the outer lands being greater than that of the lips on the middle land.

9. A valve as set forth in claim 6 with the addition that said lands are provided with annular lips for engagement with the end faces of said rings.

10. A valve as set forth in claim 6 with the addition that said middle land is a separate element loosely mounted on said valve member to be capable of limited rocking movement.

11. In a flow controlling valve of the sliding type, a housing having a bore and two axially spaced ports, a valve member extending and axially slidable in said bore, and means responsive to axial movement of said valve member for controlling fluid flow between said ports, said means including a rigid ring axially slidable in said bore and so disposed therein that fluid flowing between said ports passes through the ring, said ring fitting said bore loosely enough to permit limited rocking movement of the ring, resilient sealing means carried by said ring and engaging the wall of the bore, and a land carried by said valve member at one side of and radially overlapping said ring, said land being engageable with said ring to prevent fluid flow between said ports.

12. In a flow controlling valve of the sliding type, a housing having a bore and two axially spaced ports, a valve member extending and axially slidable in said bore, and means responsive to axial movement of said valve member for controlling fluid flow between said ports, said means including a rigid ring axially slidable in sealing engagement with the wall of said bore and so disposed therein that fluid flowing between said ports passes through the ring, and a land carried by said valve member at one side of and radially overlapping said ring, said land being engageable with said ring to prevent fluid flow between said ports, said ring when not engaged by said land being freely slidable in said bore under the influence of differential fluid pressures acting respectively on its end faces.

13. In a flow controlling valve of the sliding type, a housing having a bore and two axially spaced ports, a valve member extending and axially slidable in said bore, and means responsive to axial movement of said valve member for controlling fluid flow between said ports, said means including a rigid ring axially slidable in sealing engagement with the wall of said bore and so disposed therein that fluid flowing between said ports passes through the ring, and a land carried by said valve member at one side of and radially overlapping said ring, said land being engageable with said ring to prevent fluid flow between said ports, said valve member being provided with a pair of opposed shoulders, said land being a separate element disposed between said shoulders and having limited freedom of rocking movement on the valve member, and a resilient means urging said land toward contact with one of said shoulders.

14. A flow-controlling valve, comprising a housing having a bore provided with axially spaced, opposed shoulders defining end portions of reduced diameter, said bore between said shoulders having a uniform diameter, said housing being provided between said shoulders with three axially spaced ports communicating with said bore, the intermediate one of said ports being an inlet port for connection to a source of fluid and the other ports being motor ports for connection to a reversible hydraulic motor, a valve member extending and axially slidable in said bore, said valve member having a pair of axially spaced lands located between and radially overlapping said shoulders, the axial distance over said lands being less than the distance between said shoulders to permit limited axial movement of the valve member, a ring slidable in sealing engagement with said bore and disposed between said lands in overlying relation to said inlet port, said ring having an opening extending radially through it to provide communication between the interior of the ring and the inlet port, said ring being overlapped radially by said lands and having a length less than the distance between said lands to permit limited axial movement of the ring relative to the valve member, said housing having an outlet port, and passage means connecting said end chambers with said outlet port.

References Cited in the file of this patent

UNITED STATES PATENTS

| 2,398,811 | Stacy | Apr. 23, 1946 |
| 2,574,096 | Fischer et al. | Nov. 6, 1951 |
| 2,739,613 | Kulikoff | Mar. 27, 1956 |